United States Patent
Randall et al.

(10) Patent No.: US 10,906,630 B2
(45) Date of Patent: Feb. 2, 2021

(54) ROTATIONAL JOINT FOR AN AIRCRAFT FOLDING WING

(71) Applicant: Airbus Operations Limited, Bristol (GB)

(72) Inventors: John David Randall, Bristol (GB); Stuart Alexander, Bristol (GB); Matthew Harding, Bristol (GB); Krzysztof Jerzy Skirkowski, Bristol (GB)

(73) Assignee: Airbus Operations Limited, Bristol (GB)

( * ) Notice: Subject to any disclaimer, the term of this patent is extended or adjusted under 35 U.S.C. 154(b) by 458 days.

(21) Appl. No.: 15/737,608

(22) PCT Filed: Jun. 6, 2016

(86) PCT No.: PCT/GB2016/051666
§ 371 (c)(1),
(2) Date: Dec. 18, 2017

(87) PCT Pub. No.: WO2016/203201
PCT Pub. Date: Dec. 22, 2016

(65) Prior Publication Data
US 2018/0194453 A1    Jul. 12, 2018

(30) Foreign Application Priority Data

Jun. 19, 2015 (GB) .................................. 1510795.6

(51) Int. Cl.
*B64C 3/56* (2006.01)
*B64C 23/06* (2006.01)
(Continued)

(52) U.S. Cl.
CPC .............. *B64C 3/56* (2013.01); *B64C 23/072* (2017.05); *B64C 3/58* (2013.01); *B64C 5/08* (2013.01); *Y02T 50/10* (2013.01)

(58) Field of Classification Search
CPC .......... B64C 3/56; B64C 23/072; B64C 3/58; B64C 5/08; Y02T 50/14
See application file for complete search history.

(56) References Cited

U.S. PATENT DOCUMENTS 2,289,224 A * 7/1942 Anderson ................. B64C 3/56
244/49
2,468,425 A * 4/1949 Carpenter ................. B64C 3/56
74/520

(Continued)

FOREIGN PATENT DOCUMENTS

| CN | 102351045 | 2/2012 |
| CN | 102574575 | 7/2012 |

(Continued)

OTHER PUBLICATIONS

International Search Report of PCT/GB2016/051666, dated Aug. 8, 2016, 5 pages.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

A folding wing having a wing tip device (3) rotatable between flight and ground configurations, about an Euler axis of rotation (11). The wing tip device (3) and a fixed wing (1) are separated along an oblique cut plane (13) passing through the upper and lower surfaces of the folding wing. A rotational joint (15) for coupling the wing tip device (3) to the fixed wing (1) during rotation between the ground and flight configurations. The rotational joint includes a follower (17a) and a guide (17b), one which being fixed (Continued)

relative to the wing tip device and the other being fixed relative to the fixed wing. The follower and guide interlock such as by interlocking rings. The follower is received in the guide such that during rotation between the ground and flight configurations the follower moves along the arcuate path defined by the guide.

21 Claims, 9 Drawing Sheets

(51) Int. Cl.
*B64C 3/58* (2006.01)
*B64C 5/08* (2006.01)

(56) References Cited

U.S. PATENT DOCUMENTS

| | | | |
|---|---|---|---|
| 3,559,924 A | 2/1971 | Jochner | |
| 6,547,181 B1 | 4/2003 | Hoisington et al. | |
| 8,651,431 B1 | 2/2014 | White et al. | |
| 8,708,286 B2* | 4/2014 | Sakurai | B64C 3/56 |
| | | | 244/201 |
| 8,894,004 B1 | 11/2014 | Scott et al. | |
| 9,415,857 B2* | 8/2016 | Fox | B64C 23/072 |
| 10,137,977 B2* | 11/2018 | Thompson | B64C 3/56 |
| 2010/0264260 A1 | 10/2010 | Hammerquist | |
| 2012/0292436 A1 | 11/2012 | Karem | |
| 2013/0313356 A1 | 11/2013 | Santini et al. | |
| 2015/0097087 A1* | 4/2015 | Sakurai | B64C 23/072 |
| | | | 244/201 |
| 2016/0251075 A1* | 9/2016 | Thompson | B64C 3/56 |
| | | | 244/198 |
| 2017/0137112 A1* | 5/2017 | Winkelmann | B64C 3/56 |
| 2017/0355437 A1* | 12/2017 | Bishop | B64C 3/56 |
| 2017/0355440 A1* | 12/2017 | Bishop | B64F 5/10 |
| 2018/0222569 A1* | 8/2018 | Brakes | B64C 3/56 |

FOREIGN PATENT DOCUMENTS

| | | |
|---|---|---|
| CN | 103448903 | 12/2013 |
| CN | 103507945 | 1/2014 |
| CN | 103963958 | 8/2014 |
| CN | 104512545 | 4/2015 |
| CN | 204310032 U | 5/2015 |
| DE | 10 2010 035 188 | 3/2012 |
| EP | 2 454 588 | 5/2009 |
| EP | 2 676 878 | 12/2013 |
| EP | 2 857 309 | 4/2015 |
| FR | 1569233 | 5/1969 |
| GB | 487049 | 6/1938 |
| GB | 1 140 773 | 1/1969 |
| GB | 2524828 | 10/2015 |
| WO | WO 2010/013415 | 2/2010 |
| WO | WO 2015/150835 | 10/2015 |

OTHER PUBLICATIONS

Written Opinion of the Isa of PCT/GB2016/051666, dated Aug. 8, 2016, 7 pages.
Search Report for GB 1510795.6, dated Dec. 21, 2015, 3 pages.
Grumman Avenger folding mechanism, pre-2017, 1 page.
MiG23 wing joint, pre-2017, 1 page.
Chinese Office Action cited in CN 2020082401973290, dated Aug. 27, 2020, 11 pages.

* cited by examiner

ROTATIONAL JOINT FOR AN AIRCRAFT FOLDING WING

RELATED APPLICATION

This application is the U.S. national phase of International Application PCT/GB2016/051666 filed Jun. 6, 2016, which designated the U.S. and claims priority to United Kingdom (GB) patent application 1510795.6 filed Jun. 19, 2015, the entire contents of each of which are hereby incorporated by reference.

BACKGROUND OF THE INVENTION

The present invention relates to aircraft comprising foldable wings, and to rotational joints for use on such aircraft.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wings which may be rotated about an axis that is orientated at a compound angle, such that part of the wing is folded (for example upwardly, or downwardly, and rearwardly or forwardly), to reduce the span of the aircraft on the ground (compared to when the aircraft is configured for flight). However, a disadvantage with such arrangements (an example of which is the folding wing on the Grumman Avenger aircraft) is that they tend to require a series of secondary structures to be moved to avoid clashing between the inner and outer parts of the wing. Another disadvantage in folding wing designs more generally, is that the wing tends to have limited volume in the vicinity of the junction between the fixed and folded parts of the wing. In order to accommodate essential internal structure (e.g. ribs, spars or other support structure), and/or aircraft systems (e.g. actuators) within the wing, it may be necessary to redesign the internal layout of the wing, locally increase the wing volume in the vicinity of the junction, and/or significantly constrain the possible location of that junction.

An arrangement that seeks to mitigate at least some of the above-mentioned problems is described in PCT application number PCT/GB2015/051054 in the name of Airbus Operations Limited, filed on 2 Apr. 2015. That PCT application describes an arrangement in which a wing tip device is rotatable relative to a fixed wing between a flight configuration for use during flight, and a ground configuration for use during ground-based operations, in which ground configuration the wing tip device is rotated relative to the fixed wing such that the span of the structure is reduced. The wing tip device is rotatable between the flight and ground configurations, about an Euler axis of rotation, and the fixed wing and wing tip device are separated along an oblique cut plane, the cut plane being orientated normal to the Euler axis, such that the fixed wing and the wing tip device do not clash when rotating between the flight and ground configurations.

In such an arrangement, it has been found that the oblique nature of the cut plane can make it difficult to integrate a mechanism for actuating the wing tip device between the flight and ground configurations. The present invention seeks to provide an arrangement that addresses this problem.

SUMMARY OF THE INVENTION

According to a first aspect of the invention, there is provided an aircraft comprising a wing, the wing comprising a fixed wing and a wing tip device at the tip of the fixed wing, the wing tip device being rotatable relative to the fixed wing between: a flight configuration for use during flight, and a ground configuration for use during ground-based operations, in which ground configuration the wing tip device is rotated relative to the fixed wing such that the span of the wing is reduced. The wing tip device is rotatable between the flight and ground configurations, about an Euler axis of rotation. The axis may be angled with respect to all three of a longitudinal direction, a lateral direction and a vertical direction, the longitudinal, lateral and vertical directions all being mutually perpendicular to one another. The wing tip device and the fixed wing are separated along an oblique cut plane passing through the upper and lower surfaces of the wing, the oblique cut plane being orientated normal to the Euler axis, such that the fixed wing and the wing tip device do not clash when rotating between the flight and ground configurations. The aircraft comprises a rotational joint for coupling the wing tip device to the fixed wing during rotation between the ground and flight configurations, the rotational joint comprising a follower and a guide, one of the follower and guide being fixed relative to the wing tip device and the other of the follower and guide being fixed relative to the fixed wing. The follower and guide interlock such that loads can be transferred, from the wing tip device to the fixed wing, across the joint. The guide defines an arcuate path that curves about, and is at a radial distance from, the Euler axis. The follower and guide are arranged such that during rotation between the ground and flight configurations the follower moves along the arcuate path defined by the guide.

Such a rotational joint has been found to be especially beneficial in an arrangement in which the wing and wing tip device are separated by an oblique cut plane, and in which the wing tip device is rotatable about an Euler axis perpendicular to that cut plane. In particular, by having an arcuate path that curves about the Euler axis and at a radial distance from that axis, loads (for example bending moments) can be re-acted at that radial distance from the Euler axis; this may facilitate effective load transfer. Furthermore, having the interlock between the guide and follower enables the joint to transfer loads across the cut plane, whilst allowing the follower to move along the arcuate path defined by the guide to enable rotation between the wing and wing tip device.

The follower and guide interlock such that loads can be transferred, from the wing tip device to the fixed wing, across the joint. The interlock is preferably arranged to hold the joint together under the action of a force having a component in a direction parallel to the Euler axis. The interlock is preferably arranged to hold the joint together under the action of a force having a component in a direction perpendicular to the Euler axis. The interlock is preferably arranged to hold the joint together under the action of a moment about an axis perpendicular to the Euler axis. The interlock is arranged, however, to nevertheless allow the follower to move along the arcuate path defined by the guide. The interlock is preferably arranged to allow rotation of the follower, about the Euler axis, such that it moves along the path defined by the guide. Thus the interlock may be arranged to allow rotation under the action of a moment about the Euler axis.

The aircraft is preferably arranged such that at least some of the aerodynamic and inertial loads on the wing tip device during use, are transferred to the fixed wing, via the rotational joint. The rotational joint may thus provide one load transfer path. The aircraft may comprise other structure for providing additional load transfer paths (or to ensure load transfer is fail-safe). In some embodiments, the aircraft is arranged such that the majority of the aerodynamic and inertial loads on the wing tip device during use, are transferred to the fixed wing, via the rotational joint. In other embodiments, substantially all the aerodynamic and inertial loads on the wing tip device during use, may be transferred to the fixed wing, via the rotational joint.

The follower is preferably arranged to rotate relative to the guide. The follower may be arranged within the guide, such that during rotation between the ground and flight configurations the follower moves along the arcuate path defined by the guide.

In principle, the arcuate guide may comprise one or more separate sections (for example separate arcs of a circle) spaced around the Euler axis. However, in some embodiments of the invention, the follower may comprise a first ring. The guide may comprise a second ring. The first and second rings may interlock such that loads can be transferred, from the wing tip device to the wing, across the joint. The first and second rings are preferably concentric and orientated such that they are coaxial with the Euler axis. The first ring and the second ring may be arranged such that during rotation between the ground and flight configurations the first ring rotates relative to the second ring. The first ring is preferably received in the second ring such that during rotation between the ground and flight configurations the first ring rotates within the second ring. The follower and guide may be the inner and outer races of a slew ring.

Providing an arrangement in which the follower and guide are in the form of interlocking rings has been found to be advantageous because rings provide a continuous interface between the follower and the guide. This tends to enable effective load transfer and may also enable the joint to provide a wide range of movement (potentially even 360 degree movement). Furthermore, using rings in the rotational joint may enable the ends of the fixed wing and the wing tip device to be sealed from the elements (for example with planar structures parallel to the cut-plane). This is advantageous because it may enable the actuation mechanism to be shielded from the outside environment (especially when the wing tip device is in the ground configuration, when it might otherwise be exposed to a harsh environment such as exposure to de-icing fluid).

It will be appreciated that the rings need not necessarily be a mathematically-exact ring shape. For example, the rings may comprise features (such as those features required to form the interlock), which deviate from such a mathematical shape. The rings are, however, preferably ring-like. The second ring preferably defines a circular path.

The rotational joint preferably comprises a hollow centre. The hollow centre is preferably concentric with the Euler axis. Providing a joint with a hollow centre has been found to be especially beneficial because secondary elements (such as cabling, bleed-air, pipework etc.) may be fed between the fixed wing and the wing tip device via this hollow centre. By routing through the centre of the joint, these secondary elements tend to experience relatively little movement as the wing tip device rotates between the flight and ground configurations.

The cut plane is preferably a notional plane separating the fixed wing and the wing tip device (for example a cut plane created during the design phase of the wing). It will be appreciated that the cut plane need not necessarily manifest itself as a physical, planar, surface. The physical interface between the fixed wing and the wing tip device may, in reality have some structure that lies out of, or non-parallel to, the cut plane. These structural deviations from the cut plane are, however, preferably insufficient to cause clashing during rotation between the flight and ground configurations.

In some embodiments of the invention, the wing may comprise an interface between the fixed wing and the wing tip device. The interface may comprise a pair of substantially planar structures orientated parallel to the oblique cut-plane. The pair of substantially planar structures may comprise a fixed wing-rib (i.e. a rib of the fixed wing) orientated substantially parallel to the cut plane. The fixed wing-rib is preferably the outermost rib of the fixed wing. The pair of substantially planar structures may comprise a wing tip device-rib (i.e. a rib of the wing tip device) orientated substantially parallel to the cut plane. The wing tip device-rib is preferably the innermost rib of the wing tip device.

The rotational joint preferably spans the substantially planar structures. The rotational joint is preferably orientated substantially parallel to those structures.

The cut plane is oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The orientation of the Euler axis is preferably such that when the wing tip device is rotated about the axis, from the flight configuration to the ground configuration, the span of the aircraft wing is reduced. The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The angle may be an acute angle. The acute angle may be positive or negative. The angle may be referred to as a compound angle.

The Euler axis is preferably orientated at a compound angle to a plane (i.e. a notional planar surface) containing the wing and more preferably containing the fixed wing (i.e. the plane generally containing the wing spar(s) and ribs of the fixed wing)).

The Euler axis is preferably at an angle of less than 45 degrees, and more preferably less than 25 degrees, from the vertical. The Euler axis may be at an angle of 15 degrees from the vertical axis. The rotational joint of the present invention has been found to be especially beneficial in embodiments in which the Euler axis is at a relatively small angle from the vertical because the actuation forces tend to be relatively low (the weight of the wing tip device is only lifted a short vertical distance when the device is rotated (i.e. a relatively upright axis results in a relatively large component of fore-aft rotations rather than up-down rotation)). Furthermore, when the orientation of Euler axis results in a shallow cut plane, the area of the interface between the fixed wing and wing tip device may be relatively large, enabling a relatively large diameter rotational joint to be used. A large diameter joint may be useful because it provides a relatively large reaction arm (equal to the radius of the joint) to react loads.

The Euler axis is perpendicular to the cut plane, thus the cut plane is preferably an oblique (i.e. non-vertical and non-horizontal) plane. The cut-surface is preferably at an angle (i.e. not including being parallel or perpendicular) to each of the planes containing the longitudinal, lateral and vertical directions.

In embodiments of the present invention, the wing tip device is configurable between: (i) a flight configuration for use during flight and (ii) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The aircraft preferably comprises an actuator arranged to actuate the wing tip device between the flight and the ground configurations.

The actuator may be arranged to drive the follower of the rotational joint such that the follower rotates relative to the guide. The actuator may be a rotary actuator. The rotary actuator is preferably configured to produce relatively high torque at relatively low rpm. The rotary actuator may comprise a motor and a drive shaft arranged to be rotated by the motor. The motor and the drive shaft may be located within the joint. The motor may be located outside the rotational joint and the drive shaft may extend into the rotational joint. Having the drive shaft (and in some embodiments the motor too) in the rotational joint (to drive the follower such that the follower rotates relative to the guide) has been found to be especially beneficial because it enables the rotational joint to be sealed from the elements (yet still be driven).

The aircraft may comprise a linear actuator arranged to actuate the wing tip device between the flight and the ground configurations. The linear actuator may be arranged to act through a location offset from the rotational joint, such that upon actuation of the linear actuator the wing tip device rotates around the joint. In such an arrangement in will be appreciated that the linear actuator does not directly drive the follower, but instead indirectly drives the follower by applying a linear force at this offset location. The linear actuator preferably extends and retracts in a direction substantially within, or parallel to, the cut plane. Such an arrangement is beneficial because the motion of the actuator will be mainly two dimensional within the plane of rotation.

The aircraft may comprise a lock for locking the wing tip device in the flight configuration. The lock may be for locking the wing tip device in the ground configuration.

The lock may act on the rotational joint directly such that movement of the follower along the guide is prevented. An arrangement in which the lock acts directly on the rotational joint has been found to be especially beneficial because it enables the locking to be independent of the relative positions of other structure of the fixed wing/wing tip device (which structure may experience considerable relative movement between the flight and ground configurations). By acting on the rotational joint directly, the wing tip device, may, for example, be able to be locked in both the flight and ground configurations. This may be especially beneficial because it reduces the number of components required to lock the wing tip device in both configurations.

The lock may act at a location remote from the rotational joint. The lock may comprise a locking member arranged, in a locking configuration, to extend across the cut plane to lock the wing tip device in the flight configuration. In an unlocked configuration the locking member may be retracted to one side of the cut plane. The direction of extension and retraction of the locking member may be substantially parallel to the Euler axis (normal to the cut-plane). Such an arrangement has been found to facilitate relatively easy extension/retraction of the locking member because there tend to be relatively low loads on the locking member.

The rotational joint may be arranged such that during movement of the follower along the guide, the separation between the fixed wing and the wing tip device, in a direction parallel to the Euler axis, is altered. Such an arrangement has been found to be especially beneficial because it may reduce rubbing/wearing that would otherwise occur at the interface between the fixed wing and wing tip device, during rotation. More specifically, by ensuring the separation between the fixed wing and the wing tip device is altered during rotation, it may prevent components (such as aerodynamic seals (on the wing tip device and/or fixed wing)) becoming worn when the wing tip device rotates. During movement into the flight configuration, it may also enable a tight fit between the fixed wing and wing tip device to be effected (for example, it may enable an aerodynamic seal to be compressed as the separation between the fixed wing and wing tip device is reduced and they are drawn together).

The guide may comprise a ramped surface. The ramped surface preferably has height (in the direction parallel to the Euler axis) that changes with circumferential position. The joint may be arranged such that, during rotation of the wing tip device, the follower moves along the ramped surface to change the separation of the fixed wing and the wing tip device.

The rotational joint is preferably a sealed unit. Such an arrangement is beneficial because it ensures the joint may be protected from the external environment (e.g. water, de-icing fluid etc,). Embodiments in which the follower and guide are first and second rings are especially beneficial because such an arrangement tends to be relatively straightforward to seal since the rings may form a continuous surface.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of the fixed wing. The leading edge of the wing tip device is preferably a continuation of the leading edge of the fixed wing, such that there is a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

The above-mentioned aspect of the invention is described herein with reference to a wing. However, the invention, may, in principle, be applicable to any foldable aerodynamic structure comprising an inner region and an outer region (rotatable relative to the inner region). According to further aspects of the invention, there is provided the method and apparatus claimed herein but in respect of an aerodynamic structure comprising an inner region and an outer region. References herein to the 'fixed wing' may be equally applicable to the 'inner region' and references herein to the wing tip device may be equally applicable to the 'outer region'.

According to another aspect of the invention, there is provided a rotational joint for use as the joint described herein. The rotational joint comprises a follower and a guide, one of the follower and guide being fixable relative to a wing tip device and the other of the follower and guide being fixable relative to the fixed wing. The follower and guide may interlock such that loads can be transferred across the joint. The guide may define an arcuate path that curves about, and at a radial distance from, an axis of rotation. The follower may be rotatable relative to the guide. The follower may be received in the guide such that the follower may move along the arcuate path defined by the guide.

According to another aspect of the invention, there is provided a wing tip device for use on the aircraft of the first aspect of the invention. The wing tip device may be suitable for rotation between the flight and ground configurations, about the Euler axis of rotation. The wing tip device may be arranged such that when it is installed on the wing, the fixed wing and the wing tip device are separated along an oblique cut plane passing through the upper and lower surfaces of the wing, the oblique cut plane being orientated normal to the Euler axis, such that the fixed wing and the wing tip device do not clash when rotating between the flight and ground configurations. The wing tip device may be configured to be attached to a rotational joint for coupling the wing tip device to the fixed wing during rotation between the ground and flight configurations. The rotational joint may comprise a follower and a guide, one of the follower and guide being fixable relative to the wing tip device and the other of the follower and guide being fixable relative to the fixed wing. The follower and guide may interlock such that loads can be transferred, from the wing tip device to the fixed wing, across the joint. The guide may define an arcuate path that curves about, and is at a radial distance from, the Euler axis. The follower and guide may be arranged such that during rotation between the ground and flight configurations the follower moves along the arcuate path defined by the guide. The rotational joint may be as described with reference to the second aspect of the invention.

According to yet another aspect of the invention, there is provided a fixed wing for use on the aircraft of the first aspect of the invention. The wing may comprise a fixed wing at the tip of which a rotatable wing tip device may be installed. The fixed wing may be arranged such that when the wing tip device is installed on the wing, the fixed wing and the wing tip device may be separated along an oblique cut plane passing through the upper and lower surfaces of the wing, the oblique cut plane being orientated normal to the Euler axis, such that the fixed wing and the wing tip device do not clash when rotating between a flight and ground configuration. The fixed wing may be configured to receive a rotational joint for coupling the wing tip device to the fixed wing during rotation between the ground and flight configurations. The rotational joint may comprise a follower and a guide, one of the follower and guide being fixable relative to the wing tip device and the other of the follower and guide being fixed relative to the fixed wing. The follower and guide may interlock such that loads can be transferred, from the wing tip device to the fixed wing, across the joint. The guide may define an arcuate path that curves about, and is at a radial distance from, the Euler axis. The follower and guide may be arranged such that during rotation between the ground and flight configurations the follower moves along the arcuate path defined by the guide. The rotational joint may be as described with reference to the second aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 4 is a view showing the rotational joint in the first embodiment of the invention, from side-on;

DETAILED DESCRIPTION

Figure 1A:
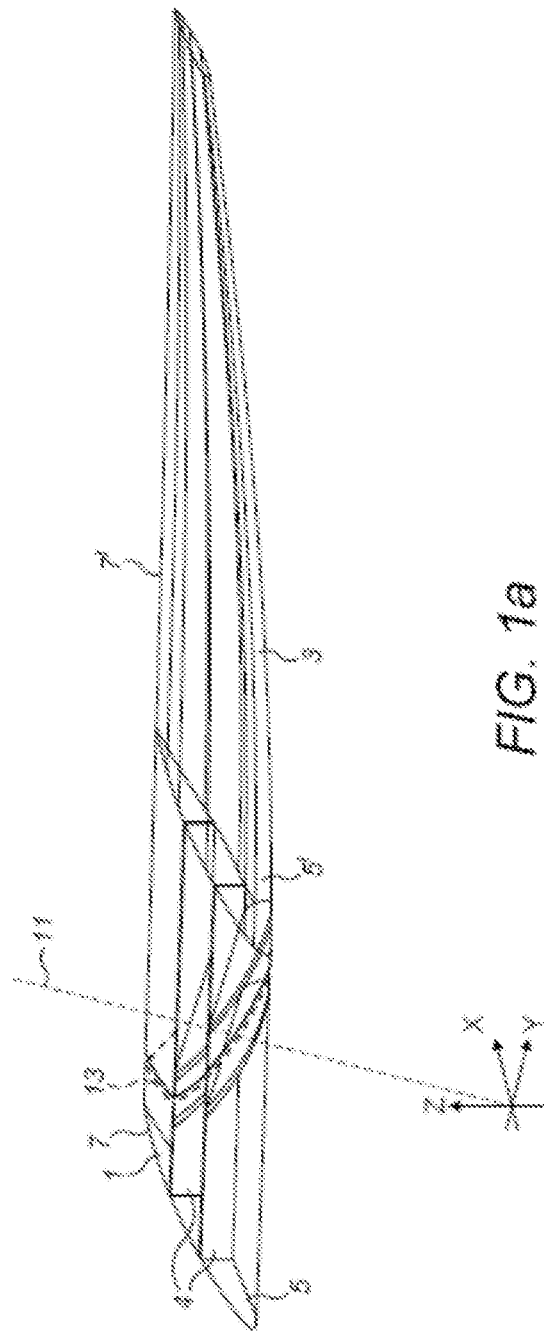
FIG. 1a shows a perspective view of a swept wing on a passenger aircraft according to a first embodiment of the invention.
Figure 1B:
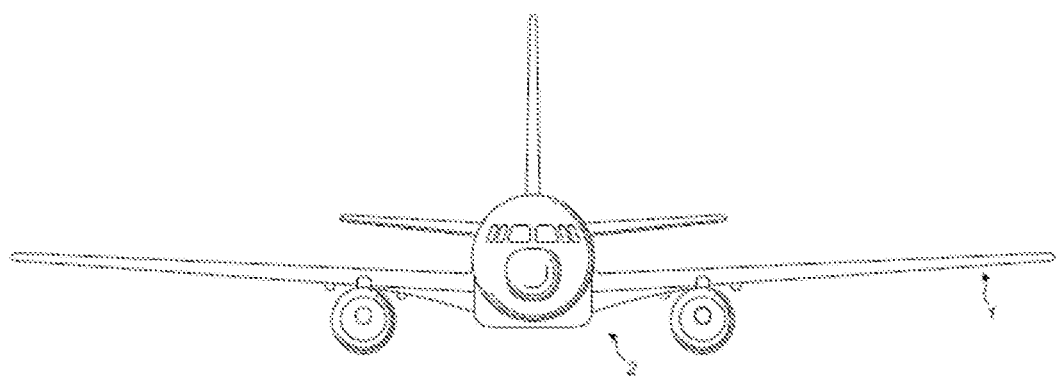
FIG. 1b shows a front view of the passenger aircraft according to the first embodiment of the invention.

FIG. 1a is a perspective view of a fixed wing 1 and a wing tip device 3 on an aircraft 2 (see FIG. 1b) according to a first embodiment of the invention. In the first embodiment, the wing tip device 3 is in the form of a planar wing tip extension, although the invention is also applicable to other types of wing tip device (such as winglets), and to other foldable aerodynamic structures per se.

Figure 2:
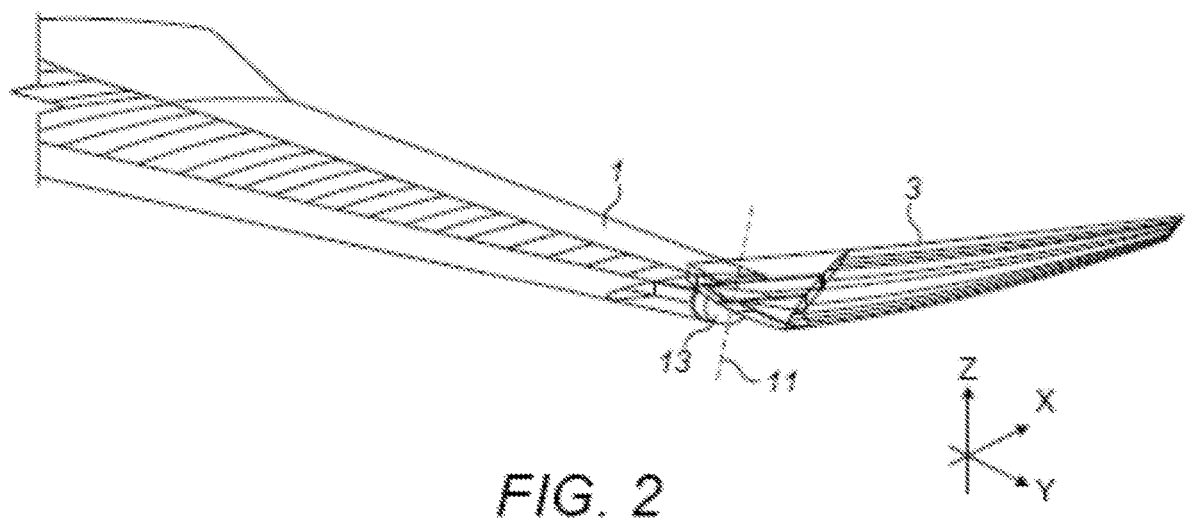
FIG. 2 shows a perspective view respectively of the wing of FIG. 1a, when the wing tip device is rotated about the Euler axis to a ground configuration.

The wing tip device 3 is moveable between a flight configuration (FIG. 1a) and a ground configuration (FIG. 2). In the flight configuration, the leading and trailing edges 5', 7' of the wing tip device 3 are continuations of the leading and trailing edges 5, 7 of the fixed wing 1. Furthermore, the upper and lower surfaces of the wing tip device 3 device are continuations of the upper and lower surfaces of the fixed wing 1. Thus, there is a smooth transition from the fixed wing 1 to the wing tip device 3. The wing skins in FIG. 1a are shown in phantom such that some of the internal structures such as the spars 4 are visible.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). Thus, in the first embodiment of the invention, the wing tip device 3 is moveable to a ground configuration for use when the aircraft is on the ground.

In the ground configuration (FIG. 2) the wing tip device 3 is folded, from the above-mentioned flight configuration, such that the wing tip device 3 rotates rearwards (aft), sweeping in a downward arc. When the wing tip device 3 is in the ground configuration, the span is reduced and the aircraft 2 thus complies with the above-mentioned airport clearances etc.

The wing tip device 3 is rotatable about an Euler axis of rotation 11, from the flight configuration, to the ground configuration. In the first embodiment, the Euler axis 11 is at a compound angle to the plane of the wing such that the axis 11 extends out of the plane of the fixed wing (most clearly shown in FIG. 1a). The Euler axis is the axis about which the movement of the wing tip device may be described in a single rotation. The Euler axis 11 is orientated at an acute angle to all three mutually orthogonal directions (vertical Z, chordwise X, and spanwise Y).

An oblique cut plane 13 separates the fixed wing 1 and the wing tip device 3. The cut plane 13 is a plane extending perpendicular to the Euler axis, that notionally separates the fixed wing 1 and the wing tip device 3. Since the cut plane 13 is perpendicular to the Euler axis 11, it ensures the fixed wing and the wing tip device do not clash during rotation of the wing tip device between the flight and ground configurations.

The folding wing arrangement described above with reference to FIGS. 1a to 2 is described in PCT application number PCT/GB2015/051054 in the name of Airbus Operations Limited, filed on 2 Apr. 2015. In such an arrangement it has been found that the oblique nature of the cut plane 13 can make it difficult to efficiently integrate a mechanism for actuating the wing tip device 3 between the flight and ground configurations. Embodiments of the present invention seek to provide arrangements that address this problem.

Figure 3:
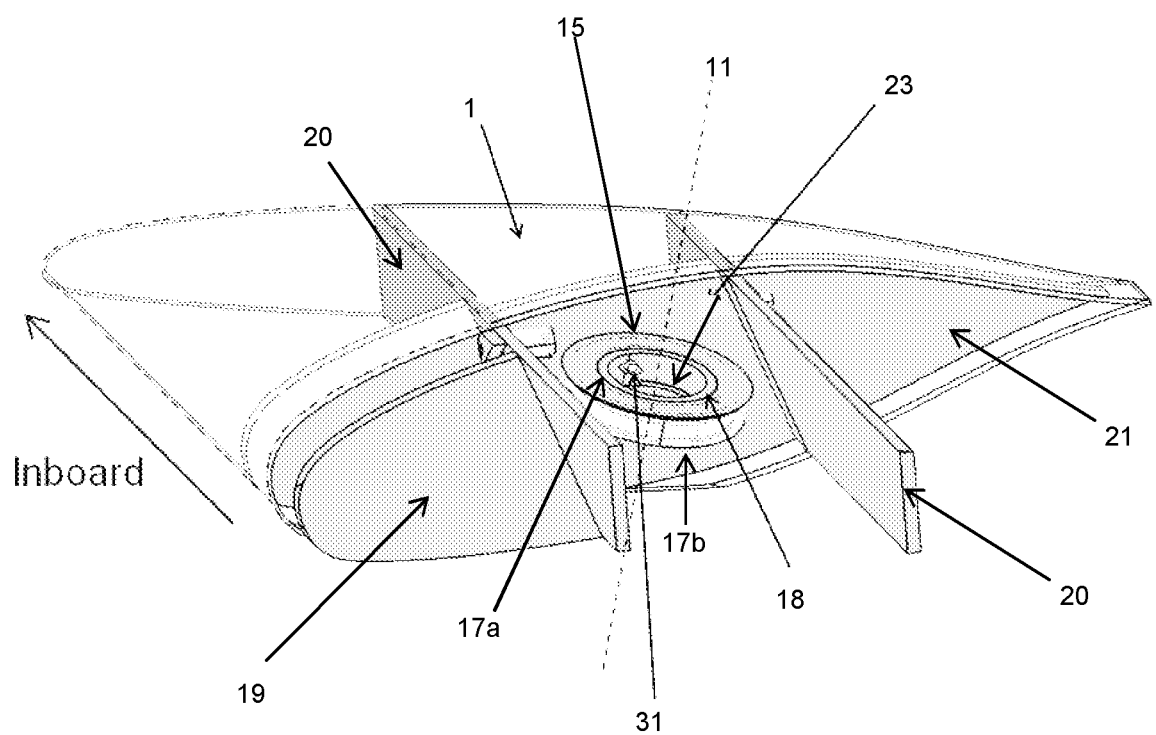
FIG. 3 is a perspective cut-away view showing the rotational joint in the first embodiment of the invention.
Figure 4:
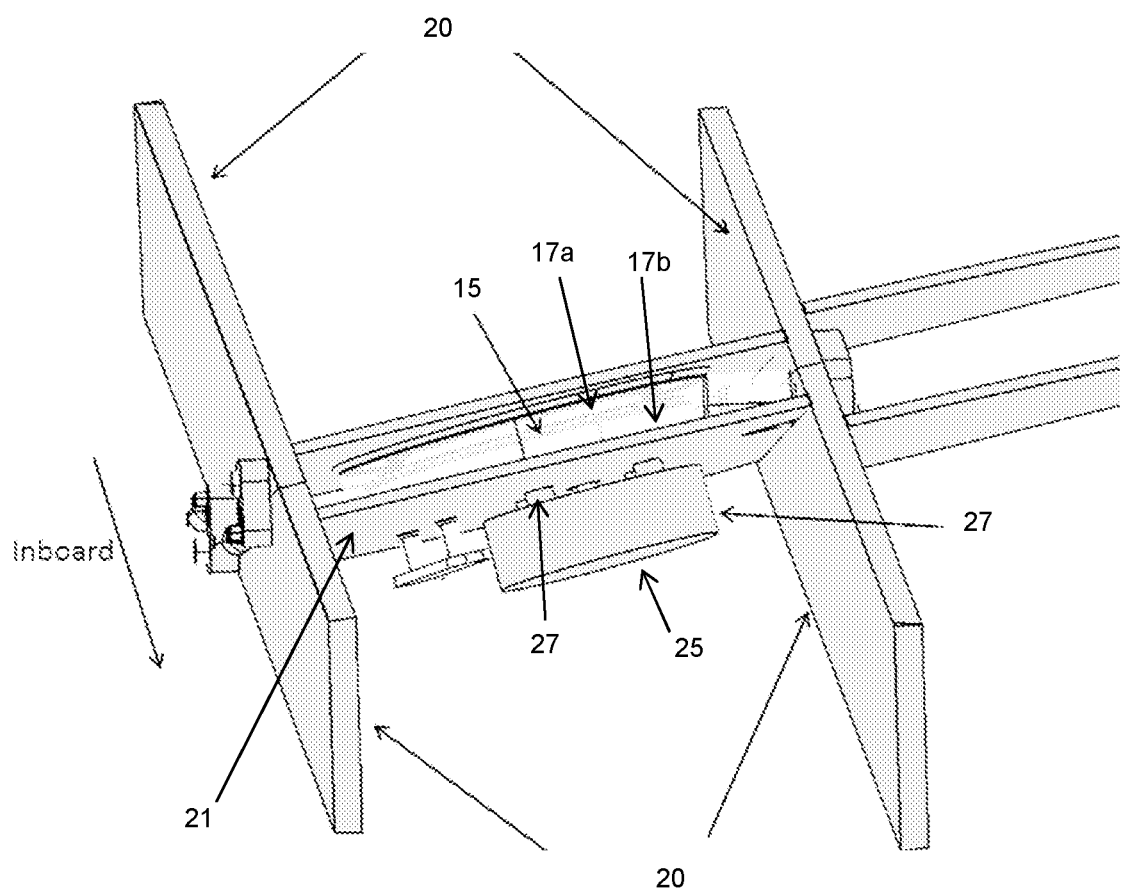

Referring now to FIGS. 3 and 4, the aircraft comprises a rotational joint 15 coupling the wing tip device to the fixed wing 1 during rotation between the ground and flight configurations. The rotational joint 15 comprises two ring members 17a, 17b. The ring members 17a, 17b are concentric and both orientated such that they are coaxial with the Euler axis 11. Accordingly the ring members 17a, 17b are therefore also parallel to the cut-plane 13. The second ring member 17b is shown in phantom and is separated from the first ring member 17a by a bearing plate 18.

The first ring member 17a is mounted on, and orientated parallel to, the innermost rib 19 of the wing tip device. This innermost rib 19 is obliquely angled such that it is parallel to the cut plane 13 (in FIG. 3 some of the innermost rib of the wing tip device is not shown for the sake of clarity as it would obscure the rotational joint 15). The second ring member 17b is fixedly mounted on, and orientated parallel to, the outermost rib 21 of the fixed wing 1. The outermost rib on the fixed wing is also obliquely angled such that it is parallel to the cut plane 13. Thus, the interface between the fixed wing 1 and the wing tip device 3 comprises two, parallel, spaced apart ribs 19, 21 both orientated parallel to the cut plane 13. The rotational joint 15 spans these two angled ribs 19, 21 and is parallel therewith.

The joint 15 is located between the front and rear spars 20.

Figure 5:
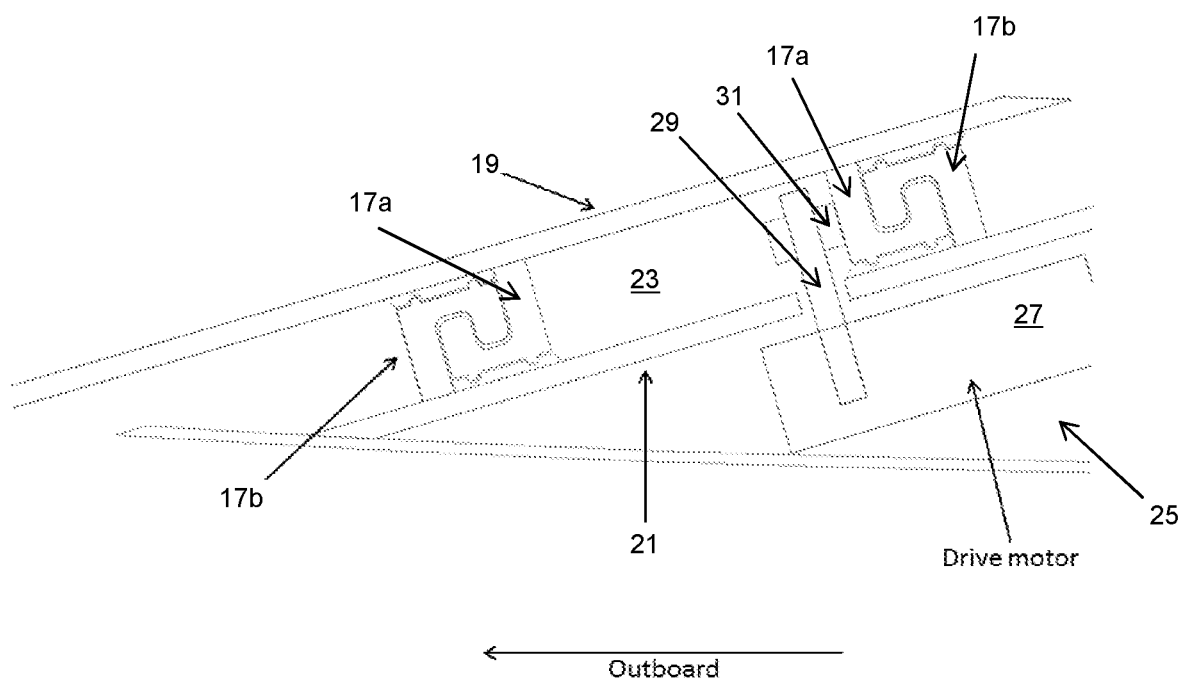
FIG. 5 is a sectional view through the rotational joint in the first embodiment.

Referring to FIG. 5 (which is a sectional view across a diameter of the joint 15) each ring member 17a, 17b has a goose-neck profile and the first ring member 17a is received in the second ring member 17b. This arrangement creates an interlock between the ring members 17a, 17b such that the two ring members 17a, 17b of the joint 15 cannot be separated under forces in the X, Y and Z directions, yet still enables the ring members 17a, 17b to rotate relative to one another.

During relative rotation between the ring members 17a, 17b, the second ring member 17b acts as a guide and radially constrains the movement of the first ring member 17a within it. In this respect, it will be appreciated that the first ring member 17a acts as a follower and the first ring member 17a is moveable to follow the circular path defined by the second ring member 17b.

In the first embodiment of the invention, the outer diameter of the second ring member 17b is around 280 mm and extends across much of the fixed wing-rib 21. By virtue of the joint 15 having this relatively large diameter, the circular path is at a relatively large radial distance from the Euler axis 11.

A rotational joint 15 having the above-mentioned features has been found to be especially beneficial when used in an arrangement in which the fixed wing 1 and wing tip device 3 are separated by an oblique cut plane 13. Firstly, by having a circular path that curves about the Euler axis 11 and at a radial distance from that axis 11, loads (for example bending moments) can be re-acted at that radial distance from the Euler axis 11; this may facilitate effective load transfer. Secondly, having the interlock between the guide 17b and follower 17a enables the joint 15 to effectively transfer loads across the cut plane 13, whilst still allowing the follower 17a to move along the arcuate path defined by the guide 17b, such that rotation between the fixed wing 1 and wing tip device 3 is enabled.

The ring members 17a, 17b are hollow and the rotational joint 15 thus includes a circular cylindrical passageway 23 extending from one side of the joint 15 to the other. This passageway 23 is used to duct cabling (not shown) between the fixed wing 1 and the wing tip device 3, without the cabling being exposed to significant twist or other movement as the wing tip device 3 rotates.

In the first embodiment of the invention, the aircraft also comprises a rotary actuator 25 arranged to directly drive the first ring member 17a. The rotary actuator (shown in FIGS. 4 and 5) comprises a motor 27 and a drive shaft 29 driven by the motor 27. The drive shaft 29 is coupled to the inner surface of the first ring member 17a via a toothed arrangement 31 such that as the drive shaft 29 rotates, it drives the first ring member 17a around the second ring member 17b. Since the first ring member 17a is fixed to the wing tip device-rib 19, this is turn rotates the wing tip device 3 between the flight and ground configurations.

The actuation arrangement in the first embodiment is especially advantageous because the drive shaft 29 protrudes inside the rotational joint 15. This enables the joint 15 and part of the actuator 29 to be sealed from the external environment. In another embodiment (not shown), the drive shaft and the motor are both located, and sealed, inside the joint.

Since the cut plane 13 is relatively shallow the weight of the wing tip device 3 is not lifted particularly far, and the torque required to move the wing tip device 3 is relatively constant (in comparison to, for example, a piano hinge fold). A rotary actuator has been found to be especially beneficial for such an arrangement. In the first embodiment of the invention, the motor 27 is able to rotate the wing tip device 3 by 60 degrees in around 15 seconds.

Figure 6:
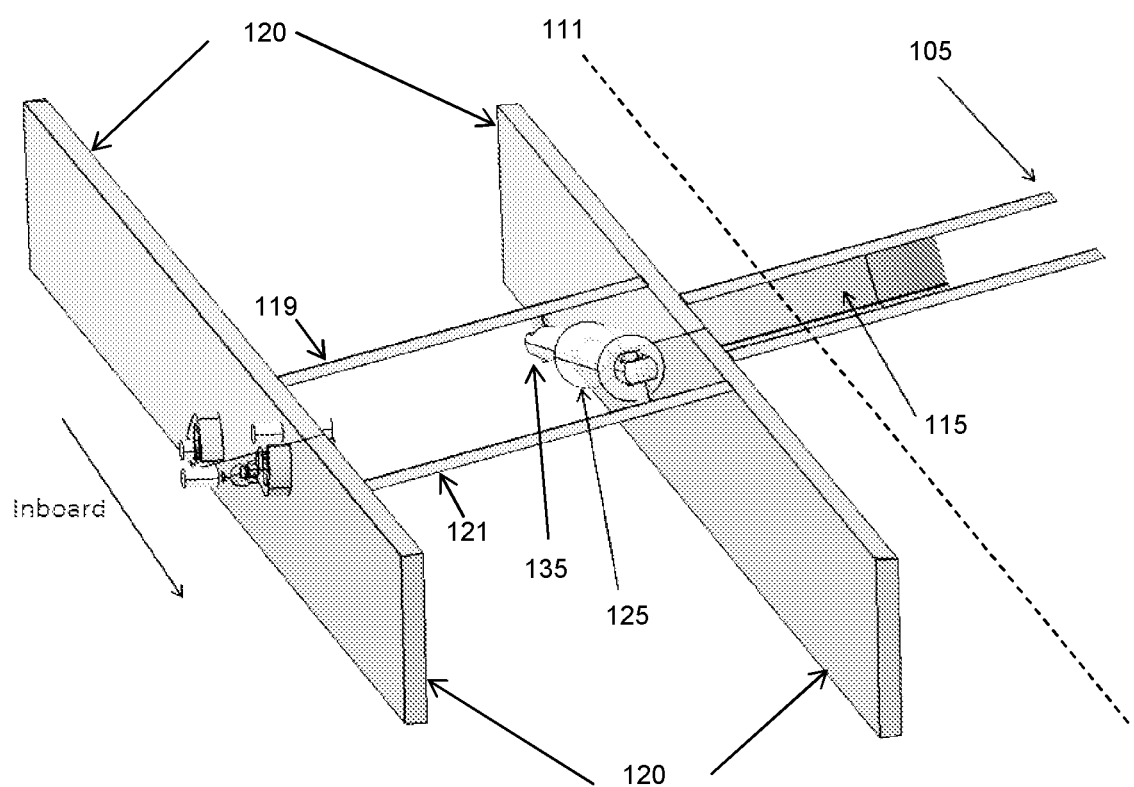
FIG. 6 is a perspective cut-away view showing the rotational joint in a second embodiment of the invention.

Notwithstanding the description of the first embodiment of the invention, it may, in some embodiments, be beneficial to use a linear actuator. FIG. 6 shows a second embodiment of the invention in which a linear actuator is used to move the wig tip device. Features in the second embodiment of the invention that correspond to similar features in the first embodiment of the invention, are shown with the same reference numerals as in the first embodiment, but with the addition of the prefix '1' (or '10' where appropriate).

The second embodiment is the same as the first embodiment except that the Euler axis 111 is shifted forwards towards the leading edge 5 of the wing. Accordingly, the rotational joint 115 is also shifted forwards, and is, in the second embodiment, forward of the spars 120 defining the edges of the wing box.

In the second embodiment, the aircraft comprises a linear actuator 125 having an extendable/retractable rod 135. The base of the linear actuator 125 is pivotably fixed on the wing tip device-rib 119, whereas the rod is pivotably attached to the fixed wing-rib 121. As it extends/retracts, the linear actuator 125 exerts a force on the fixed wing-rib 121 at a location offset from the joint 115 and the Euler axis 111. As a result, the wing tip device is urged to rotate around the joint 115 as the actuator 125 extends/retracts.

The actuator 125 extends/retracts substantially within the cut plane 113. As such, the actuator 125 only undergoes substantially 2D motions within that plane as the wing tip device is actuated.

In this embodiment, the rotational joint 115 is not driven directly. Nevertheless it is still advantageous in its function of transferring and distributing loads between the fixed wing and the wing tip device.

Figure 7:
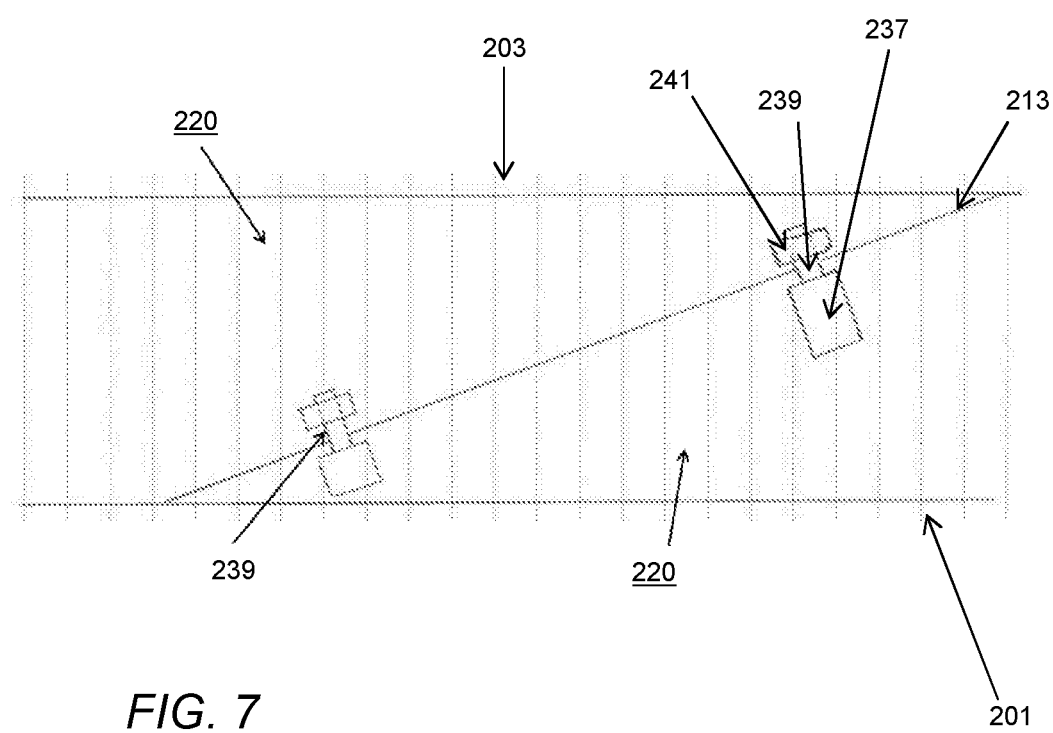
FIG. 7 is a locking mechanism used in a third embodiment of the invention.

FIG. 7 shows a third embodiment of the invention. Features in the third embodiment of the invention that correspond to similar features in the first embodiment of the invention, are shown with the same reference numerals as in the first embodiment, but with the addition of the prefix '2' (or '20' where appropriate). The third embodiment is the same as the first embodiment except that the aircraft further comprises a locking mechanism 237 for locking the wing tip device 203 in the flight configuration.

FIG. 7 is a schematic side view of the interface between the fixed wing 201 and the wing tip device 203. Specifically, FIG. 7 shows the spars on the respective fixed wing/wing tip device, and the cut plane 213 passing therethrough. The locking mechanism 237 comprises two shot bolts 239 arranged to be received in respective lugs 241. When the bolts 239 are in the lugs 241, they prevent rotation between the fixed wing 201 and the wing tip device 203, whereas when they are retracted (not shown) such rotation is allowed.

The shot bolts are orientated parallel to the Euler axis (perpendicular to the cut plane 213). Since the rotational joint (not visible in FIG. 7) is arranged to transfer the majority of the inertial loads from the wing tip device 203, the shot bolts 239 are subjected to minimal shear loads. They are therefore relatively easy to retract from/engage with the lugs 241. Such an arrangement therefore provides a simple and reliable locking mechanism.

Figure 8:
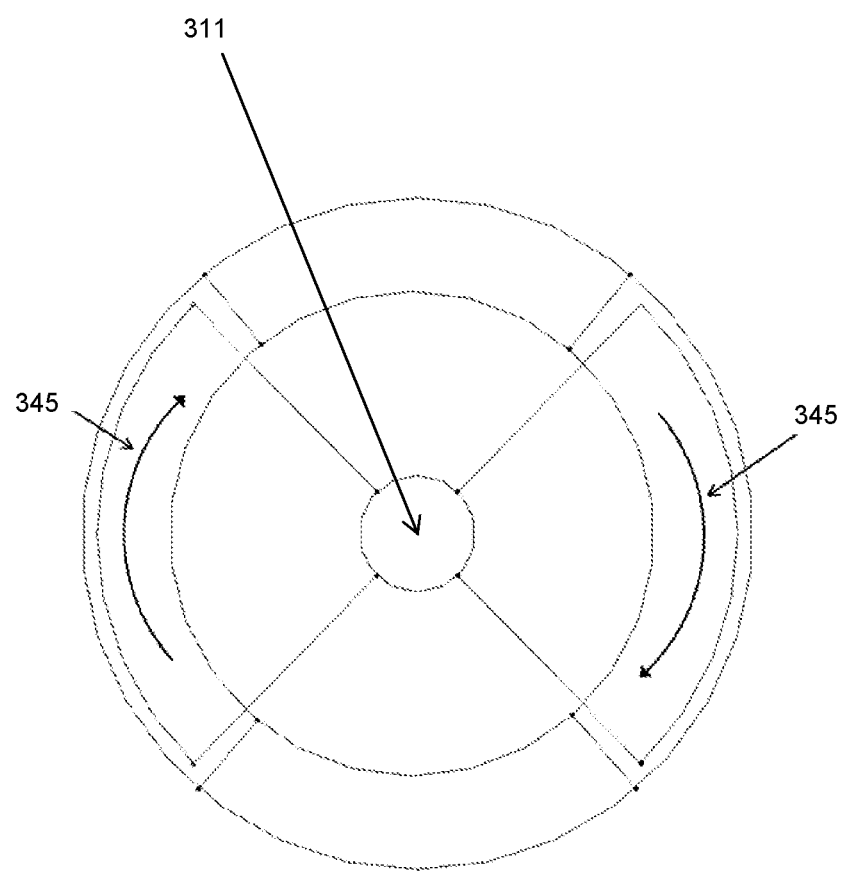
FIG. 8 is a sectional schematic view of rotational joint in a fourth embodiment on the invention.

FIG. 8 shows a fourth embodiment of the invention. Features in the fourth embodiment of the invention that correspond to similar features in the first embodiment of the invention, are shown with the same reference numerals as in the first embodiment, but with the addition of the prefix '3' (or '30' where appropriate). The fourth embodiment is the same as the first embodiment except for some parts of the internal structure of the rotational joint 315.

FIG. 8 is a schematic showing a cross section through the depth of the joint 315. The ring member 317b forming the guide comprises two diametrically opposite ramped guide surfaces 345. During rotation of the first ring member within the second ring member the first ring member moves along these ramped surfaces. As the ring member rises up the ramped surface, the separation (in a direction parallel to the Euler axis) between the ring members, and hence between wing tip device and the fixed wing, increases. Such an arrangement has been found to be especially beneficial when used in an arrangement in which the wing and wing tip are separated by an oblique cut plane, because it may reduce rubbing/wearing that would otherwise occur at the interface between the fixed wing and wing tip device, during rotation. More specifically, by ensuring the separation between the fixed wing and the wing tip device is altered, it prevents aerodynamic seals (not shown) on the wing tip device and fixed wing becoming worn when the wing tip device rotates.

During movement into the flight configuration (in which the ring member moves down the ramped surface 345, it also enables a tight fit between the fixed wing and wing tip device and enables the aerodynamic seal to be compressed.

Whilst the present invention has been described and illustrated with reference to particular embodiments, it will be appreciated by those of ordinary skill in the art that the invention lends itself to many different variations not specifically illustrated herein. By way of example the outer region need not necessarily be a wing tip device; the aerodynamic structure may not necessarily be a wing, and may, for example be part of a tail plane, or a control surface; the aircraft need not necessarily be a passenger aircraft and may, for example, be a UAV. The interlock need not necessarily be formed from a gooseneck, and other interlocking arrangements are possible; for example, the joint may be in the form of a slew ring having an inner race that is rotatable relative to an outer race.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing comprising a fixed wing and a wing tip device at a tip of the fixed wing, the wing tip device being rotatable relative to the fixed wing between:
   a flight configuration for use during flight, and
   a ground configuration for use during ground-based operations, in which ground configuration the wing tip device is rotated relative to the fixed wing such that the span of the wing is reduced,
   wherein the wing tip device is rotatable between the flight and ground configurations, about an Euler axis of rotation, angled with respect to all three of a longitudinal direction, a lateral direction and a vertical direction, the longitudinal, lateral and vertical directions all being mutually perpendicular to one another, and
   wherein the wing tip device and the fixed wing are separated along an oblique cut plane passing through the upper and lower surfaces of the wing, the oblique cut plane being orientated normal to the Euler axis, such that the fixed wing and the wing tip device do not clash when rotating between the flight and ground configurations, and
   wherein the aircraft further comprises a rotational joint for coupling the wing tip device to the fixed wing during rotation between the ground and flight configurations, the rotational joint comprising a follower and a guide, one of the follower and guide being fixed relative to the wing tip device and the other of the follower and guide being fixed relative to the fixed wing, wherein the follower and guide interlock such that loads can be transferred, from the wing tip device to the fixed wing, across the joint,
   wherein the guide defines an arcuate path that curves about, and is at a radial distance from, the Euler axis,
   wherein the follower and guide are arranged such that during rotation between the ground and flight configurations the follower moves along the arcuate path defined by the guide,
   wherein the rotational joint is arranged such that during movement of the follower along the guide, a separation between the fixed wing and the wing tip device, in a direction parallel to the Euler axis, is altered, and
   wherein the guide comprises a ramped surface and the joint is arranged such that, during rotation of the wing tip device, the follower moves along the ramped surface to change the separation between the fixed wing and the wing tip device.

2. The aircraft according to claim 1, wherein the follower comprises a first ring, and the guide comprises a second ring, the first and second rings interlocking such that loads can be transferred, from the wing tip device to the wing, across the joint, the first and second rings being concentric and orientated such that they are coaxial with the Euler axis, and first ring and the second ring being arranged such that during rotation between the ground and flight configurations the first ring rotates relative to the second ring.

3. The aircraft according to claim 1, wherein the wing comprises an interface between the fixed wing and the wing tip device, the interface comprising a pair of substantially planar structures orientated parallel to the oblique cut-plane.

4. The aircraft according to claim 3, wherein the pair of substantially planar structures comprise a fixed wing-rib orientated substantially parallel to the cut plane, and a wing tip device-rib orientated substantially parallel to the cut plane.

5. The aircraft according to claim 3, wherein the rotational joint spans the substantially planar structures and is orientated parallel to those structures.

6. The aircraft according to claim 1, wherein the Euler axis of rotation is angled by less than 45 degrees to the vertical direction.

7. The aircraft according to claim 1, wherein the aircraft comprises an actuator arranged to actuate the wing tip device between the flight and the ground configurations, the actuator being arranged to drive the follower of the rotational joint such that the follower rotates relative to the guide.

8. The aircraft according to claim 7, wherein the actuator is a rotary actuator comprising a motor and a drive shaft arranged to be rotated by the motor.

9. The aircraft according to claim 8, wherein the motor is located outside the rotational joint and the drive shaft extends into the rotational joint.

10. The aircraft according to claim 1, wherein the aircraft comprises a linear actuator arranged to actuate the wing tip device between the flight and the ground configurations, the linear actuator being arranged to act through a location offset from the rotational joint, such that upon actuation of the linear actuator the wing tip device rotates around the joint.

11. The aircraft according to claim 10, wherein the linear actuator extends and retracts in a direction substantially parallel to the cut plane.

12. The aircraft according to claim 1, wherein the aircraft is arranged such that the majority of the aerodynamic and inertial loads on the wing tip device during use of the aircraft, are transferred to the fixed wing, via the rotational joint.

13. The aircraft according claim 12, wherein substantially all the aerodynamic and inertial loads on the wing tip device during use of the aircraft, are transferred to the fixed wing, via the rotational joint.

14. The aircraft according to claim 1, further comprising a lock for locking the wing tip device in the flight configuration.

15. The aircraft according to claim 14, wherein the lock acts on the rotational joint directly such that movement of the follower along the guide is prevented.

16. The aircraft according to claim 14, wherein the lock comprises a locking member arranged, in a locking configuration, to extend across the cut plane to lock the wing tip device in the flight configuration, and an unlocked configuration in which the locking member is retracted to one side of the cut plane.

17. The aircraft according to claim 16, wherein the direction of extension and retraction of the locking member is substantially parallel to the Euler axis.

18. A wing tip device suitable for rotation between flight and ground configurations, about an Euler axis of rotation,
wherein the wing tip device is arranged to be separated from a fixed wing along an oblique cut plane passing through upper and lower surfaces of the fixed wing, the oblique cut plane being orientated normal to the Euler axis, such that the fixed wing and the wing tip device do not clash when the wing tip device rotates between the flight and ground configurations, and
wherein the wing tip device is configured to be attached to a rotational joint for coupling the wing tip device to the fixed wing during rotation between the ground and flight configurations, the rotational joint comprising:
a follower and a guide, one of the follower and guide being fixable relative to the wing tip device and the other of the follower and guide being fixable relative to the fixed wing,
wherein the follower and guide interlock such that loads can be transferred, from the wing tip device to the fixed wing, across the joint,
wherein the guide defines an arcuate path that curves about, and is at a radial distance from, the Euler axis,
wherein the guide comprises a ramped surface,
wherein the follower and guide are arranged such that during rotation between the ground and flight configurations the follower moves along the arcuate path defined by the guide, and
wherein during movement of the follower along the arcuate path, the follower moves across the ramped surface and along the arcuate path to change a separation between the fixed wing and the wing tip device.

19. An aircraft wing comprising:
a fixed wing configured to attach to a rotatable wing tip device,
wherein the fixed wing is arranged such that when the wing tip device is installed on the wing, the fixed wing and the wing tip device are separated along an oblique cut plane passing through the upper and lower surfaces of the fixed wing, the oblique cut plane being orientated normal to a Euler axis, such that the fixed wing and the wing tip device do not clash when rotating between a flight and ground configuration, and
wherein the fixed wing is configured to receive a rotational joint for coupling the wing tip device to the fixed wing during rotation between the ground and flight configurations, the rotational joint comprising:
a follower and a guide, one of the follower and guide being fixable relative to the wing tip device and the other of the follower and guide being fixable relative to the fixed wing,
wherein the follower and guide interlock,
wherein the guide defines an arcuate path that curves about, and is at a radial distance from, the Euler axis, and the guide includes a ramped surface,
wherein the follower and guide are arranged such that during rotation between the ground and flight configurations the follower moves along the arcuate path defined by the guide, and
wherein during movement of the follower along the arcuate path and over the ramped surface, a separation between the fixed wing and the wing tip device changes.

20. A wing configured for an aircraft including:
a fixed wing having a tip;
a wing tip device at the tip of the fixed wing;
a rotational joint including a follower and a guide which is interlocked with the follower, wherein one of the follower and guide is fixed to the wing tip device and the other of the follower and guide is fixed to the tip of the fixed wing,
an axis of rotation of the rotational joint is an Euler axis that projects through a plane extending in spanwise and chordwise directions through the fixed wing and is at slant with respect to a vertical axis perpendicular to the plane;
wherein the guide includes a ramped surface that defines an arcuate path which is at uniform radial distance from the Euler axis, and
the follower moves along the ramped surface and the arcuate path to cause the wing tip device to turn about the Euler axis and to cause a separation to change between the wing tip device and the fixed wing.

21. The wing of claim 20 wherein the wing tip device turns from an unfolded, flight configuration orientation with respect to the fixed wing and a folded, ground based orientation with respect to the fixed wing.

* * * * *